United States Patent [19]

Ahmed et al.

[11] Patent Number: 4,769,255

[45] Date of Patent: Sep. 6, 1988

[54] SPREADABLE BUTTER-LIKE COMPOSITION AND METHOD FOR PRODUCTION THEREOF

[75] Inventors: Salah H. Ahmed, Elk Grove Village; Anthony J. Luksas, Downers Grove, both of Ill.

[73] Assignee: Dairy Research, Inc., Rosemont, Ill.

[21] Appl. No.: 54,774

[22] Filed: May 27, 1987

[51] Int. Cl.$^4$ ............................................. A23D 3/00
[52] U.S. Cl. .................................. 426/603; 426/580; 426/581; 426/586; 426/587
[58] Field of Search ............... 426/581, 580, 603, 663, 426/586, 587

[56] References Cited

U.S. PATENT DOCUMENTS 4,511,591  4/1985  Andersson .......................... 426/603
4,555,411  11/1985  Moran et al. ....................... 426/603

Primary Examiner—Donald E. Czaja
Assistant Examiner—Celine T. Callahan
Attorney, Agent, or Firm—Murray and Whisenhunt

[57] ABSTRACT

A method is provided for producing a butter-like composition which has a taste, texture and mouth feel similar to butter but which is speadable at refrigeration temperatures. A feed of at least one liquid dairy product which is primarily and oil-in-water emulsion and has a fat content of at about 8% is prepared. The feed is concentrated by removing water until a concentrate having at least about 40% fat is obtained. The concentrate is homogenized and a phase reversal of the concentrate is caused, either prior to, during or after homogenization, so that the emulsion of the concentrate is converted from a primarily oil-in-water emulsion to a predominantly water-in-oil emulsion. The concentrate, thereby, forms a butter-like composition, and the ratio of oil-in-water emulsion to water-in-oil emulsion in the composition is at least about 6:4, and preferably between 7:3 and 8:2.

21 Claims, 1 Drawing Sheet

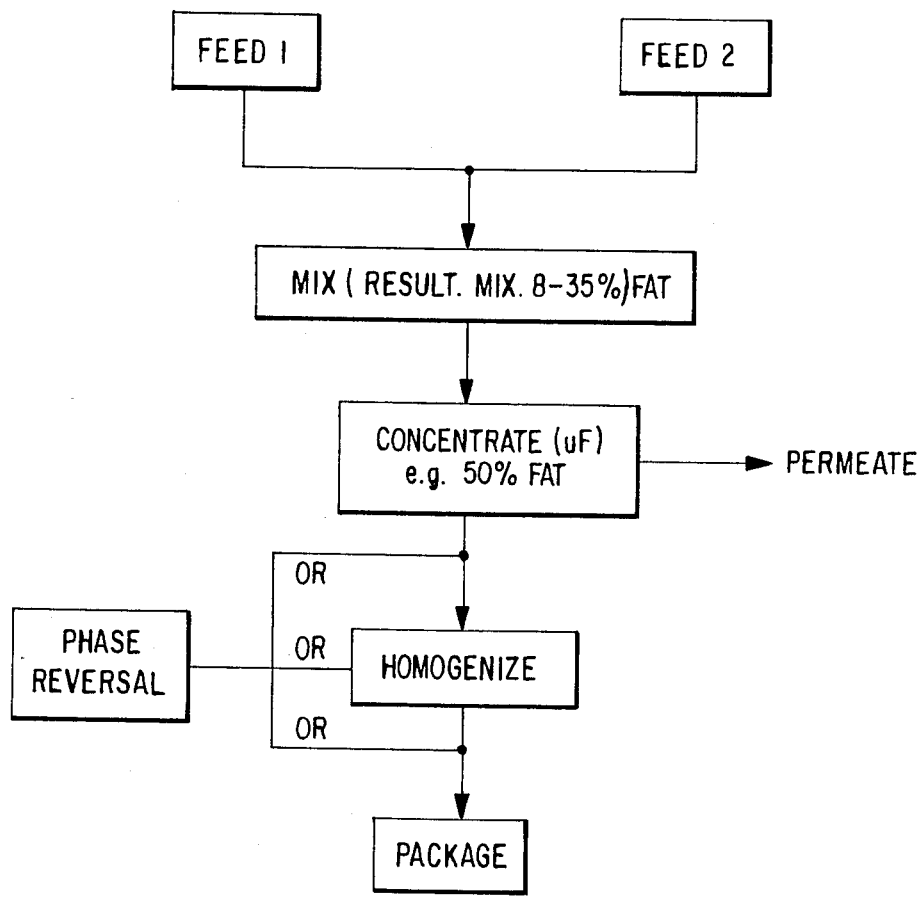

SPREADABLE BUTTER-LIKE COMPOSITION AND METHOD FOR PRODUCTION THEREOF

The present invention is directed to spreadable butter-like compositions and to methods of producing such compositions. More particularly, the invention is directed to such compositions and methods where the compositions have a taste, texture and mouth feel similar to natural butter, but which can be easily spread, e.g., on toast, at refrigeration temperature and which, on the other hand, can be used even at room temperatures without oiling out of the compositions.

BACKGROUND OF THE INVENTION

Natural butter is made by churning a high butterfat liquid dairy product to destabilize the emulsified butterfat contained therein and coagulate that butterfat as butter. In the more traditional processes for producing butter, the dairy product, e.g., whole milk or cream or mixtures thereof, is first soured with a streptococcus organism, which provides some flavor and facilitates the destabilization of the butterfat emulsified in the dairy product. However, it is not necessary to sour the dairy product prior to churning, and some commercial processes do not do so. Indeed, a number of processes have been proposed in the prior art for producing butter which depart markedly from the traditional butter making process.

As an example of the foregoing, U.S. Pat. No. 2,505,654 recognizes that butter is made by changing cream from a fat-disbursed-in-milk serum state to a milk serum-disbursed-in-fat state, and that this, in general, involves a mechanical conversion of the butterfat from the small discreet globules suspended in the milk serum to a coalesced condition wherein the fat globules are merged into a substantially continuous mass which, upon working out of a predetermined amount of the milk serum, becomes commercial butter. Thus, that patent also recognizes that, at first blush, it would appear that butter could be made from cream by concentrating the fat until it coalesces into a continuous phase. However, also as reported in that patent, this is not true, because one of the important characteristics of butter is its flavor and odor, and both of these qualities are imparted to the finished butter by substances at least partly contained in the milk serum. Thus, the fat can be concentrated only to a certain degree while still retaining sufficient milk serum to insure good flavor and odor in the finished butter. The reference goes on to then propose a continuous process for producing butter, rather than the traditional batch process, based on concentrating the cream, e.g., by centrifugal or gravitational separation, and subjecting the concentrated cream to freezing, whereby milk serum and fat separate to a certain extent. The then concentrated fat is thawed and churned to produce butter in a continuous process.

As part of that process, free milk serum is drained off and the semi-solid continuous phase is extruded as butter, but in that extrusion, the butter is "worked" to adjust the amount of milk serum remaining therein and the texture and consistency of the butter can somewhat be regulated by the amount of milk serum retained in the butter. Accordingly, in this process some ability to control the texture and consistency of the butter is possible, as opposed to the more traditional processes, where the texture and consistency are essentially non-controllable. This feature of that process is in recognition of a long-standing problem in the art in connection with butter.

In this latter regard, as is well known, butter must be refrigerated for storage purposes, since otherwise the butter will rapidly turn rancid and, in addition, will "oil-out" (the butter will partially lose its shape and/or butter oil will separate from the butter). However, at refrigeration temperatures, e.g., 35° to 45° F., the fat of the butter crystalizes and forms a relatively stiff matrix. Since butter, as noted in the aforementioned patent, is a composition where the butterfat forms a continuous matrix, the stiff crystalized butter matrix resists spreading, e.g., spreading the butter on toast with a knife. In other words, ordinary butter at refrigeration temperatures is essentially non-spreadable.

The usual means of avoiding this problem is to remove the butter from refrigeration temperatures and allow the butter to warm prior to use. However, this is an inconvenience, since depending upon the amount and configuration of the butter, e.g., a stick of butter, the time of warming sufficiently to make the butter spreadable can be as long as one-half hour or more. In addition, if the butter is inadvertently left at room temperature or above for a significant period of time, the butter will tend to "oil-out", mainly in that the butter begins to lose its shape. Further, the temperature of the butter when being spread is relatively critical. For example, if the butter has warmed too much, e.g., during a warm summer day, then when the butter is applied to, for example, warm toast, e.g. toast at about 95° F., the butter will immediately melt (oil-out to a considerable degree) onto the areas of application on the toast and be absorbed by the toast, mainly as a liquid or semi-solid, in those localized areas. This prevents a uniform spreading of the butter on the toast and is a result of the butter "oiling-out".

Beyond the ability to somewhat adjust the texture and consistency by substantial departures from the usual commercial butter making process, such as that described by U.S. Pat. No. 2,505,654, as discussed above, the art has sought other means of avoiding the problem of the spreadability of butter, especially at refrigeration temperatures. These efforts in the art may be generally classified as the production of "butter-like" spreads. The most notable of these is margarine, but margarine is based on vegetable fats, rather than butterfat, and for much of the reasons explained in U.S. Pat. No. 2,505,654, and briefly noted above, the taste and odor of margarine are not similar to butter. Thus, while margarine is widely accepted as a spread, it is not considerd to be substantially similar to butter in either taste, texture or mouth feel.

U.S. Pat. No. 4,307,125 discloses a low-fat butterlike product having good low temperature spreadability. This process involves adding an emulsifier and a hydrocolloid to cream, chilling the mixture and causing a phase inversion (reversal) without syneresis (the oil-in-water emulsion of the cream is reversed to a water-in-oil emulsion without substantial separation of the butterfat). In a sense, therefore, this approach makes a "gel" structure, which is necessary since the water content of the cream is substantially retained in the product. Such spreads, therefore, have relatively low butterfat contents and the taste and texture is not similar to butter, although the composition has better spreading properties than natural butter. For example, as that patent points out, some butters will have a needle penetrometer number at 2° C. of about 27, while the low-fat spread of that patent will have a needle penetrometer number at the same temperature of about 149, the penetrometer number being an index of spreadability.

Other approaches in the art have been toward separating the components of the butterfat and reemulsifying certain of those components to achieve a more spreadable butter-like spread. Thus, U.S. Pat. No. 4,436,760 prepares a water-in-oil emulsion based on a low-melting butterfat fraction. The water content of the product is higher than 20% and preferably ranges from 40% to 70%. The spread is made by fractionating butterfat, in which a high-melting stearin fraction and a low-melting olefin fraction are obtained, and then cooling and working the olefin fraction into a water-in-oil emulsion. While substantial spreadability is achieved, the high water content of the product renders the product substantially different from butter in taste, texture and mouth feel.

U.S. Pat. No. 4,438,149, commonly assigned with the aforenoted patented, teaches a similar product and process, but utilizes the stearin fraction, rather than the olefin fraction, which stearin fraction is combined with a liquid oil, e.g., soybean oil, to form a lowcalorie spread. However, this product, likewise, suffers from the same disadvantage as that of the previously discussed patent.

As can therefore be appreciated from the foregoing, these efforts in the prior art have not been satisfactory for producing a spreadable butter and none of these efforts have met with substantial commercial success. Recently, however, a proposal has been made in the art for producing a composition which has a texture and mouth feel somewhat similar to butter and which composition is based on a different approach from those discussed above. Thus, U.S. Pat. No. 4,511,591 disclosed concentrating a dairy product, such as skim milk, to prepare a dairy protein concentrate. After the concentrate is formed, e.g., by ultrafiltration, butter or concentrated cream is added thereto and homogenized. The fat (from the butter or cream) is disbursed as an oil-in-water emulsion with the protein concentrate forming a natural emulsifier for the oil-in-water emulsion. Emulsification takes place by way of a conventional dairy homogenization step. The product which results is spreadable at refrigeration temperatures. However, the product has a taste dissimilar to butter, and the texture and mouth feel, while somewhat similar to butter, are nonetheless recognizably distinct therefrom. The taste, texture and mouth feel are better described as being similar to cream cheese, as opposed to the taste, texture and mouth feel of butter. The composition also encounters some of the problems encountered by margarine if allowed to warm significantly above refrigeration temperatures.

As can therefore be appreciated, these efforts in the prior art have not been entirely satisfactory. It would therefore be of substantial value to the art to provide a composition which is not only spreadable at refrigeration temperatures but which has all of taste, texture and mouth feel similar to butter, while at the same time will not "oil-out" when the composition reaches temperatures above room temperature.

BRIEF DESCRIPTION OF THE INVENTION

The invention is based on three primary discoveries and several subsidiary discoveries. A first basic discovery in this regard is that all of taste, texture and mouth feel must result from a composition which is predominantly a water-in-oil emulsion. It was discovered that this is the reason why the taste, texture and mouth feel of the product of U.S. Pat. No. 4,511,591 more approximates the taste, texture and mouth feel of cream cheese (an oil-in-water emulsion) rather than the taste, texture and mouth feel of butter. Hence, from this discovery it was learned that any composition which is to be similar to butter in all of taste, texture and mouth feel must be predominantly a water-in-oil emulsion.

A second basic discovery is that the taste, texture and mouth feel of butter results, in part, from butter actually being a combination of a water-in-oil emulsion and an oil-in-water emulsion. While the ability to accurately pinpoint the ratios of the water-in-oil emulsion to oil-in-water emulsion in butter has not been developed, it appears that the ratio in butter is somewhere about 9:1 or above. Unfortunately, however, when that ratio of water-in-oil emulsion to oil-in-water emulsion is about 9:1, or above, the fat phase will crystalize at refrigeration temperature as discussed above, and thus will render the composition essentially non-spreadable, for the reasons explained above.

Therefore, as a subsidiary discover in the invention, it was found that compositions which contain both a water-in-oil emulsion and an oil-in-water emulsion, must have a ratio thereof at or below about 9:1, or otherwise the nonspreadability of butter will also appear in that composition.

On the other hand, as a further subsidiary discovery, it was found that if that ratio is not at least about 6:4, then the taste, texture and mouth feel does not approximate that of butter. For example, it was found that the composition of U.S. Pat. No. 4,511,591 is actually a mixture of water-in-oil emulsion and oil-in-water emulsion, although the oil-in-water emulsion considerably predominates in that composition. Indeed, it appears that the ratio of water-in-oil emulsion to oil-in-water emulsion in that composition is about 1:5 which, as it turns out, is about the same ratio as cream cheese, thus explaining why that composition has a taste, texture and mouth feel more similar to cream cheese than to butter.

As a further basic discovery, it was found that in order to achieve the taste, texture and mouth feel of butter, the composition must have a fat content of at least about 40% (the remainder being primarily water or milk serum and protein). Otherwise, the composition will have a predominantly watery taste, texture and mouth feel, as opposed to a predominantly fat taste, texture and mouth feel of butter.

As another subsidiary discovery in this regard, it was also found that the composition must be prepared so that essentially all of the fat which ultimately resides in the composition is in the emulsions from which the composition is formed and that fat cannot be added after those emulsions are formed, which is opposite the process in U.S. Pat. No. 4,511,591.

Finally, as a subsidiary discovery, it was found that in order to achieve these high fat levels, the dairy product from which the composition is made must be considerably concentrated prior to forming the composition; otherwise its high fat levels cannot be obtained, and the resulting composition will not have the taste, texture and mouth feel of butter.

Thus, very briefly stated, the present invention provides a method for producing a butter-like composition which has a taste, texture and mouth feel similar to butter but which is spreadable at refrigeration temperatures. The process comprises preparing a feed of at least one liquid dairy product which is primarily an oil-in-water emulsion and has a fat content of at least about 8%. The feed is then concentrated by removing, primarily, water from the feed until a concentrate having at least about 40% fat is obtained. The concentrate is then homogenized. However, either prior to, during, or after homogenization, a phase reversal of the concentrate is caused so that the emulsion of the concentrate is converted from a primarily oil-in-water emulsion to a predominantly water-in-oil emulsion. The composition, thus, forms a butter-like composition which has both water-in-oil emulsion and oil-in-water emulsion, but wherein the ratio thereof is at least about 6:4.

The process produces a butter-like composition which has a taste, texture and mouth feel similar to butter but which is spreadable at refrigeration temperatures and will not "oil-out" at room temperature or even above. The composition comprises a concentrated mixture of at least one water-in-oil emulsion and at least one oil-in-water emulsion of dairy products where the proportion of a water-in-oil emulsion to the oil-in-water emulsion is at least about 6:4 and wherein the fat content of the butter-like composition is at least about 40%.

IN THE DRAWING

The FIGURE shows, in diagrammatic form, the basic steps of a preferred form of the process.

DETAILED DESCRIPTION OF THE INVENTION

The process of the invention can best be understood by reference to the FIGURE, which is a diagrammatic illustration of a preferred form of the process. As can be seen from the FIGURE, one or more feeds are used to produce a mixture which has a fat content of at least about 8%. The feeds can be any dairy products, so long as those dairy products are in liquid form and so long as those dairy products are primarily oil-in-water emulsions, for the reason explained below. However, most dairy products, indeed, meet these requirements and, therefore, any of the conventional dairy products may be used, for example, skim milk, low-fat milk, whole milk, non-fat milk solids, and cream and concentrated forms thereof, e.g., evaporated skim milk, whole milk, and cream. Other dairy products, such as buttermilk, could be used, and the particular form of the dairy product is not critical, other than the two reservations noted above. However, as is quite apparent, if, for example, skim milk is used as a feed, then a second feed must be used, since skim milk will not provide the necessary fat content of at least about 8%. Accordingly, in this situation, there would be at least two feeds, e.g., one of skim milk and one of cream so that the fat content of the mixture reaches at least about 8%. On the other hand, the amount of fat in the mixture should not be overly high, since it will interfere with the concentration step, discussed below. Thus, preferably, the fat content is not above about 30%, although higher fat contents than this may be used, e.g., up to about 35% fat or even a bit higher, if care is taken in the concentration step. Nevertheless, for practical and usual purposes, the fat content of the mixture will not be greater than about 30%.

On the other hand, the mixture should not be provided by simple dilution of cream. It will be appreciated that in the present process the emulsifiers which give rise to the emulsions are the natural emulsifiers of the dairy product feeds. Therefore, if one starts with a concentrated cream (which will be reduced in natural emulsifiers), and simply dilutes with water that concentrated cream, then the amount of natural emulsifiers will similarly be reduced, and the total amount of those natural emulsifiers in the mixture may not be sufficient for producing the correct emulsion. Accordingly, while more than one feed, e.g., two, three, four, or five feeds, may be used, all of these feeds should be dairy products, as explained above. The only exception to the foregoing is where the dairy product is obtained by reconstituting a dried form thereof. For example, dry non-fat milk solids may be reconstituted with water to provide a non-fat milk. However, in this case, the non-fat milk solids are considered to be a dairy product.

In the foregoing regards, the fat content of the feed, e.g., 8% to 35%, can be acheived by concentration of one or more of the feeds. For example, whole milk with a fat content of about 4% can be evaporated by well known processes, e.g., by heated vacuum pan evaporization, to produce a concentrated feed with a fat content of 8% or greater. Other concentration processes may also be used, e.g., freeze concentration, but if a concentration of a feed is performed, it is preferred that the concentration be by a process which involves heating the feed to an elevated temperature.

In this regard, it has been found that heating at least one of the feeds to an elevated temperature provides a means of somewhat controlling the ultimate spreadability of the product. Thus, if at least one of the feeds, and preferable all feeds, are heated to at least about 165° F., the spreadability of the product produced will significantly decrease, and the amount of the decrease will vary with the time the feed is held at the elevated temperature. This is because the heat treatment causes some partial denaturing of the protein which, in turn, absorbs water and stiffens the product. For example, if the entire feed is heated to about 165° F. and held at that temperature for about 15 minutes to ½ hour, the spreadability of the product will decrease about 20% to 30%, as opposed to the spreadability of the product produced from that same feed, but which has not experienced the elevated temperature treatment. Elevated temperatures up to about 200° F. may be used for this purpose, but at the higher temperatures the dwell time of the feed must be reduced or otherwise a cooked flavor will be developed in the product. Hence, temperatures of from about 165° F. up to about 200° F. may be used, with a corresponding decrease of dwell time of from about 15 minutes to about 5 seconds. The decrease is, however, not a straight line decrease, since 10 to 20 minutes at 190° F. is still acceptable.

Accordingly, if a concentration of a feed is performed, it is preferred that it be achieved with a heat treatment, as described above, especially when, and if, a less spreadable product is desired. The heat treatment may, however, likewise be performed on a feed even if no concentration thereof is desired or performed. Such a heat treatment may therefore, be in the form of a pasteurization of the feed, either in a conventional pasteurizer or in a high temperature short time pasteurizer or in an ultra-heat treatment pasteurizer.

With such heat treatments the penetrometer values (test method described below) can be adjusted for any particular feed. With usual feeds, the present process produces products with penetrometer values (cone values) of from about 100 to about 400, but with a heat treatment step the lower value can be decreased to at least about 70 or even as low as 60. This step is very usefull in producing a composition which may be printed (formed into sticks).

After the mixture is formed, that mixture must be concentrated so that the concentrate has a fat content of at least about 40%, but more preferably, as shown in the FIGURE, about 50%. The concentrate may have a fat content up to about 60%, or even greater, but at fat contents significantly above 60%, the concentration step becomes more difficult.

In this regard, the present process, as opposed to the process of U.S. Pat. No. 4,511,591, provides that all of the fat which will ultimately reside in the final product must be added to the process at the beginning thereof, i.e., at the feed step. Fat cannot be added during the process in the manner described in the aforenoted patent. Thus, the concentration step must handle all of the fat which will ultimately reside in the final product. When the fat content exceeds about 60%, it is difficult to further concentrate such high fat emulsions. For example, a preferred manner of concentration is that of ultrafiltration. Ultrafiltration can very easily concentrate a mixture having a fat content from about 8% to 25% to a concentrate having a fat content of about 40% to 60%. However, at about a 60% fat content, the efficiency of the ultrafiltration unit significantly decreases, and to achieve higher fat concentrations of the concentrate, longer processing times and more care must be conducted. While the process is not limited to a ultrafiltration concentration step, and other conventional concentration steps may be used, e.g., freeze concentration, centrification, and the like, as a practical and efficient concentration step, a 60% fat content of the concentrate is preferred, and especially a fat content less than about 70%.

As noted above, the preferred concentration step utilizes ultrafiltration. Any conventional ultrafiltration unit may be used in this regard and it is only necessary that the ultrafiltration unit retain substantially all of the protein in the concentrate (the protein, in part, functions as the natural emulsifiers), with the permeate containing, primarily, water, lactose and ash. This is achieved by the usual dairy ultrafiltration unit, and, thus, any conventional dairy ultrafiltration unit may be used in the concentrating step. Likewise, conventional temperatures for operating the ultrafiltration unit are quite acceptable, e.g., 100° to 130° F., although temperatures outside of this range may be used, if desired, e.g., 40° to 150° F.

After the concentration step, the resulting concentrate is homogenized. Any of the conventional dairy homogenizers may be used in this regard, and those homogenizers may be operated at conventional temperatures, e.g., 120° to 160° F., although temperatures outside of this range may be used if desired, e.g., 110° to 180° F. However, either prior to, during or after homogenization, the concentrate must experience a phase reversal, i.e., reversing the emulsion from, primarily, an oil-in-water emulsion to, predominantly, a water-in-oil emulsion, for the reasons explained above. This phase reversal can be achieved by any relatively high shear mixing operation. However, since homogenization is a high shear mixing operation, it is more convenient and efficient to achieve at least a portion of the phase reversal during the homogenization step and in the homogenizer. Thus, it is only necessary to operate the conventional dairy homogenizer for a time and at a shear rate which will not only homogenize the product but achieve a portion of the phase reversal at the same time. With the phase reversal, the concentrate forms a butter-like composition which is, essentially, the product of the invention.

As is well known, it is possible for certain emulsions to undergo phase reversal. Such phase reversal is achieved in different manners with different emulsions. Thus, in regard to emulsions of butterfat and milk serum, three primary factors are involved, i.e., the concentration of the butterfat in the emulsion, the condition of the milk serum (especially the pH) and the degree of shear which the emulsion experiences. For example, whole milk can undergo very high shear without a phase reversal, as is common in homogenizing whole milk. However, when the butterfat concentration is increased, the ability to experience phase reveral is also increased. It has been found in this regard that when the butterfat concentration is somewhere about 40%, phase reversal can take place with reasonable degrees of shear, i.e., shears experienced in ordinary dairy processing equipment. This is one of the reasons that the present invention requires that the feeds be concenrated to a butterfat concentration of about at least 40%.

With butterfat concentrations of about at least 40%, the presently required phase reversal is relatively easy to achieve in the usually dairy processing apparatus. In the present process, as the feed is being further and further concentrated during ultrafiltration (the preferred concentration device), and the butterfat content is increased, some phase reversal will commence during ultrafiltration. The shear required for phase reversal is provided by the shear of the pumps of the ultrafiltration unit and the hydraulic shear of the concentrate passing through the small hollow cores of the ultrafiltration membrane. When the butterfat content, during continued ultrafiltration, reaches near or exceeds 40%, substantial amounts of phase reversal will take place during ultrafiltration. Thus, it is possible to achieve the presently required phase reversal, especially in regard to the lower ratios discussed below, entirely during ultrafiltration. This will depend on the butterfat content reached during ultrafiltration, the amount of shear introduced during ultrafiltration and the processing time thereof.

However, additional shear is often required to achieve the desired degree of phase reversal, especially in regard to the higher ratios discussed below, and this additional shear is provided by the homogenization step, where further phase reversal takes place. In addition, even if all of the desired phase reversal takes place during ultrafiltration, the composition should nevertheless be homogenized, or otherwise the product will not be of the quality and uniformity normally desired.

Accordingly, while the ultrafiltration step is referred to as a concentration step, in fact, significant or even substantially all of the required phase reversal may take place in that step, and the present specification and claims are intended to so include. Likewise, while the homogenization step is characterized and a means of achieving phase reversal, little or most or even all of the phase reversal may take place during homogenization. Thus, it is the combination of ultrafiltration and homogenization which achieves the required phase reversal and the completion of the product.

The emulsifiers of the present compositions are, largely, the natural emulsifiers contained in the feeds. As the Examples illustrate, an analysis of a typical product shows protein concentrations in excess of 4%. This is, of course, a relatively high protein concentration. The emulsifiers which give rise to the present product are the natural emulsifiers occurring, largely, in the protein component of the dairy products used to produce the composition. The protein content, therefore, largely, quantifies the amount of emulsifiers in the composition. By use of such relatively high levels of natural emulsifiers, the present phase reversal, and very stable but spreadable composition are achieved. It is therefore important that this relatively high level of natural emulsifiers be maintained in the composition, and to this end, as noted above, it is important that the feed to the process be dairy products, which will contain those natural emulsifiers, as opposed to, e.g., diluted dairy product, which dilution will, on a percentage basis, similarly decrease the concentration of those natural emulsifiers.

In addition to the foregoing, it will be appreciated that the natural emulsifiers of the present composition are in, essentially, the same association with the fat as was the association of those natural emulsifiers in the dairy products fed to the process. It is possible by known techniques to remove those natural emulsifiers from dairy products and such removed natural emulsifiers could be fed back to a dairy product composition for emulsification purposes. However, once those natural emulsifiers are removed from the dairy product, and added back to some dairy product at a later time, those natural emulsifiers are never in the same natural association with the fat as when those emulsifiers were in the original dairy product. Therefore, such "added back" emulsifiers are far less efficient for emulsification purposes than the emulsifiers which are retained in their natural association with the fat, as is achieved by the present process. Similarly, if the fat is removed (thus separated from the natural emulsifiers) and added back at some later time, the resulting association of those emulsifiers with the added back fat is not the same as the natural association of those emulsifiers with the fat in a dairy product. Hence, such a procedure will not result in the same composition as that of the present invention. This is illustrated by the results of U.S. Pat. No. 4,511,591, where butterfat is added back at some later stage of the process, and the results are considerably different from that of the present invention.

As noted above, it is important to the invention that a phase reversal take place so that the resulting product is, predominantly, a water-in-oil emulsion. By achieving a predominantly water-in-oil emulsion, the product will have a taste, texture and mouth feel substantially similar to that of butter. However, as also noted above, when emulsions are formed from dairy products, the resulting emulsions, often, are not a single emulsion, i.e., an oil-in-water or water-in-oil emulsion, but are mixtures thereof. Since the feeds to the process are, primarily, oil-in-water emulsions, when the phase reversal takes place the resulting product will predominantly be a water-in-oil emulsion. However, that emulsion will also contain some oil-in-water emulsion and the amount thereof will depend upon the starting feeds and the percent completion of the phase reversal, as can be controlled, in part, by the degree and amount of shear mixing during the phase reversal. Also, as noted above, it is important to the invention that the present composition be a combination of oil-in-water emulsion and water-in-oil emulsion. The ratio of the water-in-oil emulsion to the oil-in-water emulsion must be such that the product has the taste, texture and mouth feel of butter. To achieve this result, that ratio must be at least about 6:4. Below this amount, the taste, texture and mouth feel commence to become more watery, e.g., more like cream cheese. Indeed, for this same reason, it is preferred that the ratio be at least about 7:3. However, on the other hand, as briefly noted above, if that ratio exceeds about 9:1, then the proportion of water-in-oil emulsion in the composition becomes so great that the composition is no longer spreadable at refrigeration temperatures. Therefore, it is also important to keep that ratio less than 9:1, since at higher ratios the spreadability of the composition seriously decreases.

After the homogenization step, the composition is substantially complete, unless phase reversal is carried out after homogenization. For example, if sufficient phase reversal does not take place during ultrafiltration and/or homogenization, then additional high shear mixing will be required to cause phase reversal. It is, however, preferred that phase reversal take place either during or before homogenization, since it is greatly preferred to homogenize the phase reversed composition.

In any event, to complete the composition, only conventional ingredients need be added. These conventional ingredients can include flavorings, such as salt, colorings e.g., FDA yellows, and the like.

The composition is then packaged in any convenient package by any conventional packaging apparatus. While pasteurization may be performed during packaging, if a pasteurizing step is desired, it is preferred that the pasteurizing step take place prior to homogenization. Thus, the pasteurizing step, if desired, may take place at any point in the process, preferably prior to homogenization, and more preferably in the feed step or the mixing step, although pasteurization prior to packaging may be used.

The composition which results from the process is butter-like in taste, texture, mouth feel, and appearance. It can be molded, for example, into one pound blocks, quarter pound sticks, or packaged in tubs in the conventional manner. However, the composition is substantially different from butter in other regards. It will not "oil-out" at room temperature and above, and is spreadable at refrigeration temperatures similar to butter at room temperature. On the other hand, the composition remains spreadable at temperatures all the way from refrigeration temperatures, e.g., 34° to 45° F., to room temperature and above, e.g., to 85° F. or even 95° F. This is because the composition is a concentrated mixture of at least one oil-in-water emulsion and at least one water-in-oil emulsion of the dairy products and because of the ratio of water-in-oil emulsion to oil-in-water emulsion is within the ranges explained above. In addition, since the composition will have at least 40% butterfat therein, it will also have the taste and odor of butter, as opposed to other prior art spreads which do not.

However, the characteristics of the composition will somewhat depend on the ratio of the water-in-oil emulsion to the oil-in-water emulsion. With lower ratios, the spreadability will increase but the taste, texture and mouth feel will not be as close to that of butter as higher ratios. On the other hand, as the ratio increases, the taste, texture and mouth feel will be more similar to butter, but the spreadability thereof will decrease. It has been found that the optimum combination of these properties is where the ratio is about 7:3 to 8:2, and this will produce a taste, texture and mouth feel very similar to butter, while providing good spreadability at temperatures from about 34° F. to about 85° F. In addition, there will be no substantial "oiling-out" of the composition at temperatures up to about 95° F., especially up to about 85° F.

In regard to the foregoing, the term "spreadability" is defined to mean that property of the composition which allows it to be removed or cut from packages, e.g., stick, tub or other containers, with an ordinary table knife and spread on bread or toast in a substantially even and uniform manner. As can be appreciated, this is a somewhat subjective term in the art and that term is somewhat difficult to quantify. However, spreadability can be approximated from bulk viscosities. There are various means of determining the bulk viscosity of a spread, and the penetrometer test of U.S. Pat. No. 4,307,125, discussed above, is the most useful. This test gives an arbitrary number and the number varies with the particular test device. The two most used devices are the needle and the cone. The needle gives satisfactory results at refrigeration temperatures, but at temperatures significantly thereabove the results are less accurate. Hence, for a wide range of temperatures, the cone device must be used. However, the absolute cone value will vary with the particular cone used in the test, the details of the test method and the product being tested. Hence, the specific cone values cannot be taken as an absolute number, but as a number for comparison with other cone values of similar products tested in a similar manner. In the specification and claims, the cone value therefore, are not to be construed as an absolute number but as a comparative number. These comparative cone values, as used in the specification and claims, are derived from a particular test method and cone, described more fully hereinafter.

With the above reservation, at refrigeration temperatures, e.g., 36° F., the present composition should have a cone penetrometer number of at least about 30 and far more preferably at least about 50. Good spreading does not occur until that number is about 75. On the other hand, the cone penetration number at room temperature should not be too high or the composition will be too soft. Thus, at about 75° F., the number should be about 300 or less, more preferably 275 or less. Ideally, it should be about 250 or less. Also, the ratio of the bulk viscosity, e.g., cone penetrometer number, of the composition at about 36° F. to bulk viscosity, e.g., cone penetration number, of the composition at about 75° F. should be no greater than about 5 and more preferably no greater than about 3 and ideally no greater than about 2. This will insure good spreadability at both refrigeration temperatures and room temperature. If the ratio of water-in-oil emulsion to oil-in-water emulsion is between about 7:3 and 8:2, the preferred range as noted above, the ratio of the bulk viscosities will be not greater than about 2.

The term "oiling out" as used herein refers to that property of spreads, including butter and margarine, where the spread changes from a solid form to a semisolid or liquid form. Here again, this is a term of art which is difficult to quantify. However, the affects thereof can be visually observed from changes in shape of a composition at room temperature or higher. Thus, when a spread is at room temperature or slightly higher, a percentage of that shape will slowly be lost to a semiflowed or flowed shape. In many soft spread margarines and butter, for example, that percentage will be over 50% at 95° F. With the present compositions, that percentage at 95° F. will be less than about 10%, e.g., less than 5%, and with the preferred ratios of water-in-oil emulsion to oil-in-water emulsion, that percentage will be about 0%.

The term "phase reversal" (or inversion) refers to mechanically converting the emulsion from an oil-in-water emulsion to a water-in-oil emulsion, or in some cases vise versa. In this latter regard, it will be appreciated that dairy products are, normally, mixtures of water-in-oil emulsions and oil-in-water emulsions. During the phase reversal, some of the water-in-oil emulsions may be converted to oil-in-water emulsions, and some of the oil-in-water emulsions may be converted to water-in-oil emulsions. However, in the present process, during such phase reversal, predominately only the oil-in-water emulsions are converted to water-in-oil emulsions. The extent of such phase reversal and the total amount of phase reversal depends upon several factors. These factors are the ratios of water-in-oil emulsions to oil-in-water emulsions of the original feed to the process, the amount of emulsifiers in the feeds to the process (principally the protein content), the amount of fat in the concentrate which undergoes phase reversal, the total solids of the concentrate which undergoes phase reversal, and the process parameters of the phase reversal process. In this latter regard, any mechanical means may be used for achieving the phase reversal, but as noted above it is preferred that at least part of the phase reversal take place in a conventional dairy homogenizer since the product should be homogenized and it is convenient to carry out the phase reversal during such homogenization simply by operating the conventional dairy homogenizer in a manner which will achieve phase reversal. The more conventional dairy homogenizers are two-stage homogenizers and these two stages may be operated at varying pressures. The ability to achieve homogenization and phase reversal will vary with the parameters and feeds, as discussed above, as well as the pressures of the two stages of the homogenizers. The necessary pressures of the two stages of the homogenizers (or the single stage if a single stage homogenizer is used) can only be determined imperically. Thus, the homogenizer must be operated at varying pressures of the stage or stages and then analytically determining whether or not sufficient phase reversal has taken place. For any particular feed parameters, as discussed above, only a very limited number of experiments will be required to determine the operating conditions of the homogenizer to achieve the desired phase reversal. However, as a guide, when the concentrate to experience phase reversal has a total solids of about 55%, a fat contain of about 50%, a protein content of about 4%, and an ash content about 1% (a very useful composition for purposes of the present invention), a two-stage homogenizer may be operated with about 300 to 600 lbs. pressure in the second stage and about 400 to 800 lbs. pressure in the first stage, with preferred ranges being about 350 to 450 lbs. pressure in the second stage and 500 to 700 lbs. pressure in the first stage. More usually, the pressure in both stages will total between about 800 and 2500 lbs., more generally about 900 to 1100 lbs. When the solids, fats, protein, and ash differ significantly from the above, necessary pressures in the homogenizer may vary substantially from these figures, and an imperical determination will be required.

In this latter regard, the extent and nature of the phase reversal, is usually determined microscopically, and especially electron microscopically. This is, of course, a visual determination, and such visual determination requires either some practice or some expertise in connection therewith. However, with sufficient practice or the required expertise, that visual determination should be accurate within about plus or minus 10%, on a statistical basis. As noted above, the ratio of the oil-in-water emulsion to water-in-oil emulsion in the composition should be at least about 6:4, but that figure, as well as other ratio figures, is intended to range within the experimental error, as discussed above. If during an imperical study that ratio is not achieved, then an adjustment in the operating parameters of a homogenizer will be required, or, if it is preferred, some adjustment in the feed composition, as explained above, may also be made.

The invention will now be illustrated by the following Examples, where all proportions and percentages are by weight, unless otherwise indicated, as is also the case in the foregoing specification and following claims. However, the invention is not limited to the specific examples, but extends to the scope of the foregoing disclosure.

EXAMPLE 1

Into a stirred steam jacketed mixing vat was added 83 lbs. cream (unhomogenized) with a 44.5% fat content, 77 lbs. of whole milk (unhomogenized) with a 3.75% fat content. After mixing the batch (160 lbs. total) the analysis was: total solids 29.5%, fat 23.9%, protein 3.2%, and ash 0.8%. The mixture was pasteurized at 192° F. for 3 to 5 minutes in a conventional tubular heat exchanger, cooled to 115° F. and passed through a Romicon Lab 15 Ultra-filtration system having a HF 14-60-PM50 membrane. 80 lbs. of permeate were removed from the mixture by the ultra-filtration system. 79 lbs. of concentrate were recovered, which had an analysis: Total solids 56.5%, fat 47%, protein 4.4%, and ash 0.6%. The concentrate was transferred to a 10 gal. Groen kettle, mixed with an air mixer and slowly heated to 120° F. To the mixed and heated concentrate were added: 180 gms NaCl (about 0.5% salt concentrate) and 3.59 gms of natural beta-carotene color, dissolved in 30 gms of butter to facilitate distribution of the color (about 0.01% color concentration).

The mixture was slowly heated to 165° F. and held at that temperature for 3 minutes. After cooling to 145° F., the mixture was passed through a conventional two-stage dairy homogenizer (Model 125 E Gaulin two-stage homogenizer). The homogenizer was operated at 400 psig in the second stage and 600 psig in the first stage (total pressure 1000 psig).

From the homogenizer the finished product was packaged hot (about 140° to 145° F.) in ½ lb. and 1 lb. tubs. The packages were gradually cooled to between 60° and 80° F. and then stored at refrigeration temperatures (36° F.).

The analysis of the finished product was: Total solids 57.3%, fat 47.4%, protein 4.6%, and ash 1.0%. The penetration cone number of the refrigerated product (test method being identified below) was 249.

A taste panel compared the taste of the product with high quality butter. The results were that the product had a taste, texture and mouth feel at refrigeration temperature and room temperature quite similar to butter, except that at both temperatures the texture of the present product was more soft than butter. Further, the product at refrigeration temperature could easily be spread on warm toast, whereas the butter could not.

The present product at room temperature held its shape significantly better than butter.

EXAMPLE 2

The procedure of Example 1 was repeated, except that the second stage homogenization was 500 psig and the first stage homogenization was 1000 psig (total pressure 1500 psig). The penetration cone number of the refrigerated product of this example was 158. The analyses were essentially the same as in Example 1. The results of the taste panel were similar to that of Example 1.

EXAMPLE 3

The procedure of Example 1 was repeated except: (1) the feed was 61 lbs. of 45% fat cream (unhomogenized) and 59 lbs. of skim milk (unhomogenized), which provided an analysis of: Total solids 28.58%, fat 23.98%, protein 2.27%, and ash 0.47%; (2) 65 lbs. of permeate were removed and 54 lbs. of concentrate were recovered, with an analysis of: Total solids 57.10%, fat 49.50%, protein 4.49%, and ash 0.83%; and (3) 123 gms of salt (0.5% concentrate) and 2.5% of natural beta-carotene (0.01% concentrate) were added.

The product had an analysis of: Total solids 57.3%, fat 47.4%, protein 4.6%, and ash 1.0%. The penetration cone number of the refrigerated product was 265. The taste panel results were similar to that of Example 1.

EXAMPLE 4

The procedure of Example 3 was repeated except that the second stage homogenization was 500 psig and the first state homogenization was 1000 psig (total pressure 1500 psig). The penetration cone number was 168. The taste panel results were similar to that of Example 1.

EXAMPLE 5

This example illustrates diafiltration as an additional process step. The procedure of Example 1 was repeated, except that: (1) the feed was 77 lbs. of 45% fat cream (unhomogenized), 73 lbs. of 3.7% fat whole milk (unhomogenized), which provided an analysis of: Total solids 26.8%, fat 22.8%, protein 2.7%, and ash 0.5%. (2) 65 lbs. of permeate were removed and 74 lbs. of concentrate were recovered. After this step, a diafiltration step was included by adding 15 lbs. of 110° F. deionized water to the concentrate and, after mixing, passing the mixture through the ultrafiltration system a second time to remove an additional 25 lbs. of permeate (a 20% diafiltration). The product had an analysis of: Total solids 56.0%, fat 47.5%, protein 4.2%, and ash 0.6%. (3) 170 gms of salt (0.5% concentration) and 3.40 gms of natural beta-carotene (0.01% concentration) were added.

The product had an analysis of: Total solids 56.4%, fat 48.2%, protein 4.3%, and ash 1.1%. The cone penetration number of the refrigerated product was 248. The taste panel results were similar to that of Example 1.

EXAMPLE 6

The procedure of Example 5 was repeated except that the second stage homogenization was 500 psig and the first stage homogenization was 1000 psig (a total pressure of 1500 psig). The cone penetration number of the refrigerated product was 152. The analysis was essentially the same as in Example 5. The taste panel results were similar to that of Example 1.

In the foregoing Examples the penetrometer used was Universal-Sargent-Welsh, Catalogue No. S-2235, for plasticized fats and the test procedure was according to ASTM D-217. The penetration cone was an S-63865. The same penetrometer, test procedure and cone were used in comparison tests as set forth below in Example 7.

EXAMPLE 7

As a comparison, the penetration cone numbers were determined for various like products at temperatures of 36° F. (refrigeration temperature), 60° F., 75° F. and 85° F. The comparison is shown below in Table 1. It will be noted that Table 1 compares various types of margarines, butter and the present products, as well as the results of Examples 1 through 6, in regard to the refrigeration temperature penetration cone number.

The tested margarines were "soft-spread" tub margarines. The margarine "type" listed as "Test Sample" is a high quality vegetable oil standard test sample especially manufactured for present test purposes and the standard against which the present products were judged. Commercial brands of margarine vary somewhat from time to time in spreadability and this standard test margarine was adopted to avoid such variability in commercially produced products. Similarly, the butter "type" listed as "Test Sample" was a high quality butter especially manufactured for present test purposes to, again, avoid variation in spreadability in regard to commercially produced butter. In regard to the "Present Products", samples A and B were prepared in a manner similar to Example 1 and samples C and D were prepared in a manner similar to Example 5 (having the additional diafiltration step), except that instead of the 20% diafiltration of Example 5 only a 10% diafiltration was performed.

TABLE 1

| SAMPLES | TYPE | 36° F. | 60° F. | 75° F. | 85° F. |
|---|---|---|---|---|---|
| Margarines | Soft | 58 | 125 | 277 | 330 |
| | Corn Oil | 96 | 126 | 283 | 340 |
| | Test Sample | 43 | 57 | 164 | 239 |
| Spread | Sunflower Oil | 82 | 132 | 338* | Separates |
| Butter | Test Sample | 7 | 52 | 195 | 290 |
| Present | A | 180 | 223 | 249 | 272 |
| Products | B | 125 | 165 | 204 | 218 |
| | C | 155 | 170 | 210 | 222 |
| | D | 111 | 139 | 193 | 192 |
| Example 1 | | 249 | | | |
| Example 2 | | 158 | | | |
| Example 3 | | 265 | | | |
| Example 4 | | 168 | | | |
| Example 5 | | 248 | | | |
| Example 6 | | 152 | | | |

*beginning to separate

From the above data, it can be easily seen that the lowest penetration cone number of the Present Products, i.e., 111 at 36° F. is significantly higher than the highest penetration cone number for any margarine at the same temperature, i.e., 96 for the corn oil margarine, and very much higher than that of butter, i.e. 7, at 36° F. Thus, the lowest performing present product is significantly more spreadable at refrigeration temperature than the best of the margarines and more that five time more spreadable than butter. On the other hand, the best of the Present Products, i.e., the product of Example 3, had a penetration cone number of 265, which is about 2.8 times as spreadable as the best of the margarines and nearly 14 times as spreadable as butter. These are quite unexpected and highly unusual results.

Table 1 also compares spreadability at 60° F., 75° F. and 85° F. for margarines, butter and Present Products A, B, C, and D. As noted above, in order to have a minimum acceptability of spreading, the composition should have a penetration cone number of at least about 30, and far more preferably at least about 50. However, good spreading does not occur until that number is at least about 75. It will be noted that butter reaches a cone penetration number of only 52 at 60° F., i.e., just at the minimum number for acceptable spreading, while all of the Present Products are at 139 or above, i.e. up to 223.

On the other hand, the spreadability can be so great as to render the product too fluid. Also as noted above in this regard, the maximum acceptable cone penetration number is about 300 or less, more preferably about 275 or less. At 75° F. all of the margarines, except the high quality "Test Sample" margarine had exceeded this latter number and at 85° F. all except the high quality "Test Sample" margarine had exceeded the former number, with the sunflower oil margarine having melted and the oil having separated. At 85° F. butter is only marginally acceptable, while all of the Present Products are still acceptable. This again, is a most unexpectedly and highly unusual result.

Further, in order to have relatively uniform spreading over usual ranges of temperatures for consuming the composition, the ratio of the cone penetration number at 36° F. to that number at 75° F., should not be greater than about 1:5, but preferably no greater than 1:3. Ideally, that ratio should be no greater than 1:2. Of course, the theoretically lower limit is a ratio of 1:1.

In addition, the margarines, the butter and the Present Products were heated until "oiling-out" commenced. In this test, however, the sunflower margarine melted at a temperature slightly above 75° F. and was discarded, since this is an unrealistic low oiling out temperature. The temperature increase was continued until all of the comparison samples had at least started to "oil-out", which temperature was 95° F. Table 2 shows the results.

TABLE 2

| SAMPLE | % OILING OUT |
|---|---|
| Soft Margarine: | 64% |
| Corn Oil Margarine (Tub): | 2% |
| Margarine Test Sample (High Quality Veg. Oil): | 5% |
| Butter Test Sample (High Quality Butter): | 56% |
| Present Products (all): | 0% |

Note that the present products were still stable (no oiling out) at 95° F., while all other of the comparison samples had oiled-out. It should also be noted that at 50% or higher oiling-out, the composition is no longer a solid, but a semi-solid or semi-liquid, which was the case for both the soft margarine and the Butter Test Sample (the sunflower oil was a liquid at slightly above 75° F.,). Here again, these are most unexpected and unusual results.

As will be appreciated from the above, the invention admits to variations and equivalents which will be readily apparent to those skilled in the art. Hence, such variations and equivalents are intended to be embraced by the spirit and scope of the annexed claims.

What is claimed is:

1. A method for producing a butter-like composition which has a taste, texture and mouth feel similar to butter but which is spreadable at refrigeration temperatures comprising:
   (a) preparing a feed of at least one liquid dairy product which is primarily an oil-in-water emulsion and has a fat content of at least about 8%;
   (b) concentrating the said feed by removing water, lactose and ash until a concentrate having at least about 40% fat is obtained;
   (c) homogenizing the concentrate; and
   (d) causing a phase reversal of the concentrate, either prior to, during or after homogenization of the concentrate so that the emulsion of the concentrate is converted from a primarily oil-in-water emulsion to a predominantly water-in-oil emulsion, whereby the concentrate forms a butter-like composition, and wherein the ratio of water-in-oil emulsion to oil-in-water emulsion in the composition is at least about 6:4 but is less than about 9:1.

2. The process of claim 1, wherein the feed has a fat content of up to about 35%.

3. The process of claim 1, wherein concentrate has a fat content of up to about 60%.

4. The process of claim 1, wherein the feed is selected from the group consisting of skim milk, low-fat milk, whole milk, reconstituted non-fat milk solids, cream and mixtures thereof.

5. A process of claim 1, wherein the concentration step is performed by ultra-filtration.

6. The process of claim 1, wherein the phase reversal step is at least in part performed during or before the homogenization step.

7. The process of claim 6, wherein the phase reversal step is at least in part performed during the homogenization step.

8. The process of claim 1, wherein the ratio of water-in-oil emulsion to oil-in-water emulsion in the butter-like composition is at least about 7:3.

9. The process of claim 8, wherein the said ratio is about 7:3 to 8:2.

10. The process of claim 1, wherein flavoring and coloring are added to the butter-like composition.

11. A butter-like composition which has a taste, texture and mouth feel similar to butter but which is spreadable at refrigeration temperatures and will not substantially oil-out at room temperature comprising a concentrated mixture of at least one water-in-oil emulsion and at least one oil-in-water emulsion of dairy products, where the ratio of water-in-oil emulsion to oil-in-water emulsion is at least about 6:4 but is less than about 9:1 and wherein the fat content of the butter-like composition is at least about 40%.

12. The composition of claim 11, wherein the said fat content is up to about 60%.

13. The composition of claim 11, wherein the dairy product is selected from the group consisting of skim milk, low-fat milk, whole milk, reconstituted non-fat milk solids, cream and mixtures thereof.

14. The composition of claim 11, wherein the ratio of water-in-oil emulsion to oil-in-water emulsion is at least about 7:3.

15. The composition of claim 14, wherein the said ratio is about 7:3 to 8:2.

16. The composition of claim 15, wherein the composition is spreadable at temperatures from about 34° F. to about 85° F.

17. The composition of claim 16, wherein there is no substantial oiling-out of the composition at temperatures up to about 85° F.

18. The composition of claim 11, wherein the ratio of the bulk viscosity of the composition at about 36° F. to the bulk viscosity of the composition at about 75° F. is no greater than about 1:5.

19. The composition of claim 18, wherein the said ratio is no greater than about 1:3.

20. The composition of claim 11, wherein the percentage of the composition which will "oil-out" at 85° F. is less than about 10%.

21. The composition of claim 20, wherein the said percentage is less than about 5%.

* * * * *